E. R. DEVEREUX.
PNEUMATIC TIRE FOR ROAD VEHICLES.
APPLICATION FILED APR. 25, 1914.

1,133,938.

Patented Mar. 30, 1915.

WITNESSES
F. D. Sweet
C. Bradway

INVENTOR
Edward Robert Devereux
BY Munn & Co
ATTORNEYS

# UNITED STATES PATENT OFFICE.

EDWARD ROBERT DEVEREUX, OF LONDON, ENGLAND.

PNEUMATIC TIRE FOR ROAD-VEHICLES.

1,133,938.  Specification of Letters Patent. Patented Mar. 30, 1915.

Application filed April 25, 1914. Serial No. 834,342.

*To all whom it may concern:*

Be it known that I, EDWARD ROBERT DEVEREUX, a subject of the King of Great Britain, and a resident of London, England, have invented a new and Improved Pneumatic Tire for Road-Vehicles, of which the following is a full, clear, and exact description.

My invention relates to improvements in pneumatic tires for road vehicles, of the type in which the inner tube is formed of a series of independent segments inflated from a single source.

My invention is designed to provide an improved construction of this type of tire in which the abutting ends of the segments are strengthened so as to resist the tendency of such segments to burst when in use. In combination with the segmental inner tube of my invention, I provide a laced-on cover which allows of any punctured segments being removed and repaired.

My invention is illustrated by way of example in the accompanying drawings, in which—

Figure 1:
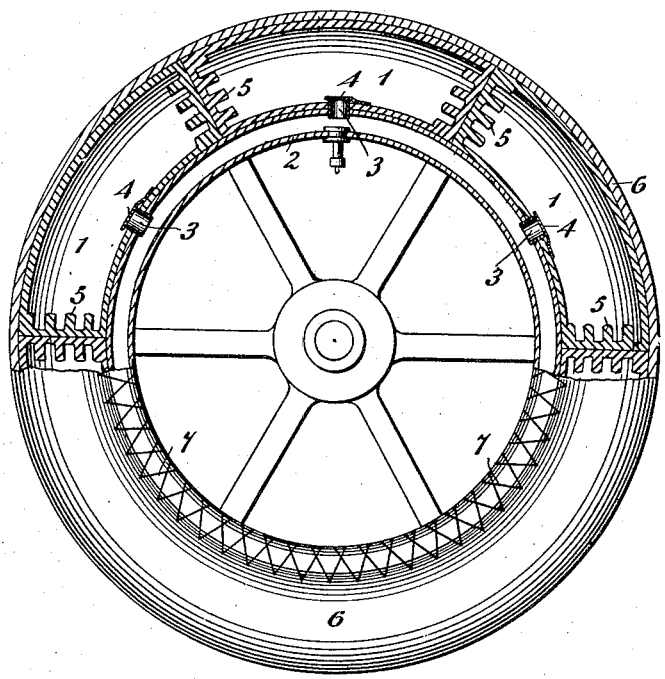
Figure 2:
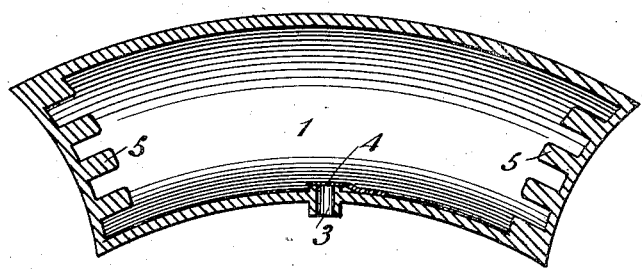

Figure 1 is a part sectional view of a wheel with the tire of my invention in position; Fig. 2 is a detail view of a segment of the inner tube of my invention showing its form when not in position.

Referring now to the drawings, the inner tube of the tire is formed of a series of segments 1 which are inflated from a common tube 2 through the series of air valves 3, the said air valves 3 being conveniently in the form of one-way valves, the air holes being covered by the rubber tongues 4 as shown.

The ends of the segments are provided with a plurality of ribs 5, the said ribs being so arranged that when the ends of one segment are abutting against the ends of the adjacent segments, the said series of ribs 5 on the internal surfaces of said abutting ends are out of register with the series of ribs 5 on the internal surfaces of the abutting ends of the adjacent segments. In order that when in position the said abutting ends of the segments may lie closely against each other and prevent any dust or dirt from working in between the ends, I curve said segmental ends as shown in Fig. 2.

It will be readily understood that when in use, said ribs will strengthen the ends of the segments.

In order to allow of any punctured segments being removed and repaired, the segmental inner tube of my invention is inclosed by an outer cover 6 fastened to the wheel by the laces 7.

Having now particularly described and ascertained the nature of my said invention, and in what manner the same is to be performed, I declare that what I claim is:—

1. A pneumatic tire comprising a plurality of segmental cells having the end walls of one segment in contact with the end walls of adjacent segments, and internal reinforcing ribs on the end walls.

2. A pneumatic tire comprising a plurality of segmental cells having the end walls of one segment in contact with the end walls of adjacent segments, and internal reinforcing ribs on the end walls, the ribs on one contacting wall being staggered with respect to the ribs on the other wall.

3. A pneumatic tire including a plurality of segmental cells each having normally concave end walls which yield outwardly under internal air pressure, whereby the end walls of adjacent segments contact when the cells are inflated, and internal ribs on the end walls.

4. A pneumatic tire including a plurality of segmental cells each having normally concave end walls which yield outwardly under internal air pressure, whereby the end walls of adjacent segments contact when the cells are inflated, and internal ribs on the end walls, the ribs on the end of a cell being staggered with respect to the ribs on the contacting end of an adjacent cell.

In testimony whereof I have signed my name to this specification in the presence of two subscribing witnesses.

EDWARD ROBERT DEVEREUX.

Witnesses:
O. J. WORTH,
W. E. ROGERS.